No. 879,777. PATENTED FEB. 18, 1908.
S. H. LACKLAND.
ELECTROMEDICAL APPLIANCE.
APPLICATION FILED APR. 22, 1907.
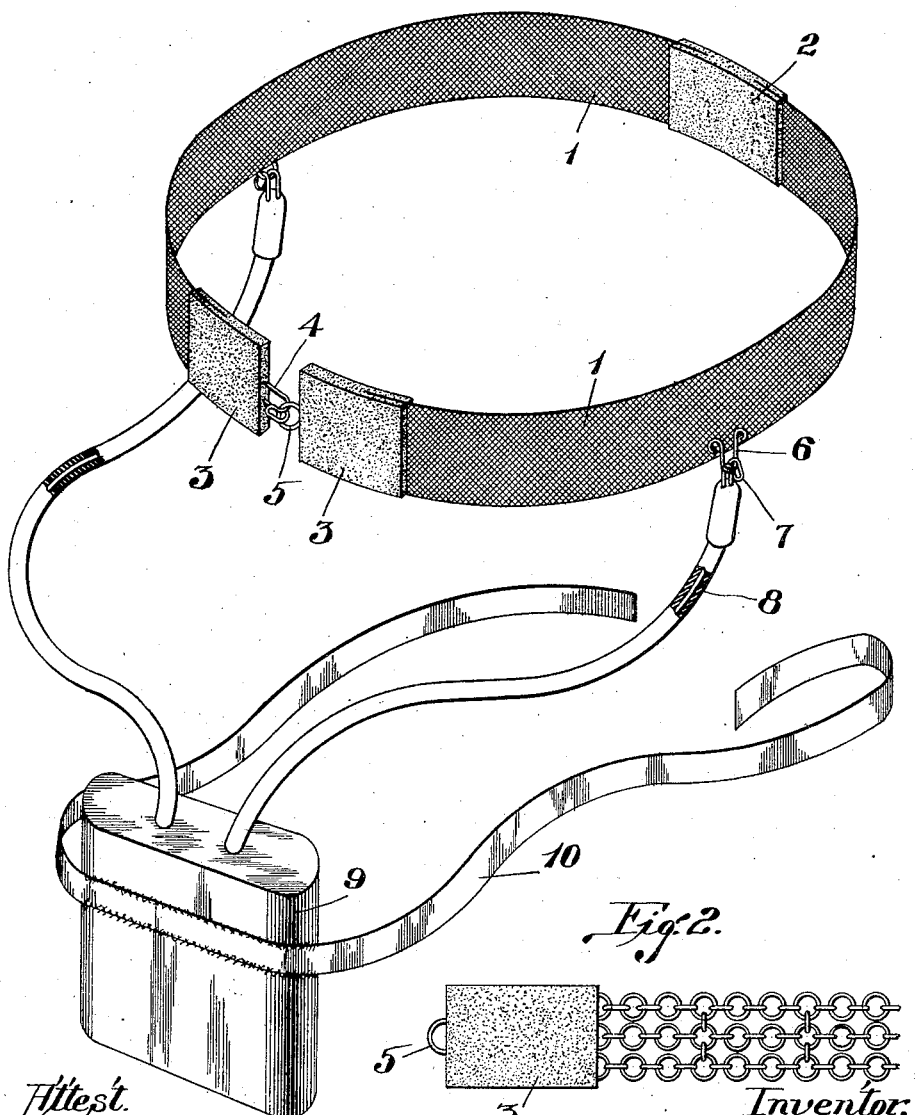
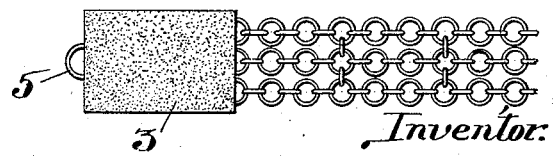

UNITED STATES PATENT OFFICE.

SAMUEL H. LACKLAND, OF ST. LOUIS, MISSOURI.

ELECTROMEDICAL APPLIANCE.

No. 879,777.     Specification of Letters Patent.     Patented Feb. 18, 1908.

Application filed April 22, 1907. Serial No. 369,698.

*To all whom it may concern:*

Be it known that I, SAMUEL H. LACKLAND, a citizen of the United States, and resident of St. Louis, Missouri, have invented certain new and useful Improvements in Electromedical Appliances, of which the following is a specification containing a full, clear, and exact description, reference being had to the accompanying drawings, forming a part hereof.

My invention relates to an electro medical appliance, and my object being to construct a simple, inexpensive, compact appliance to be worn around the neck of a patient, and particularly adapted for generating a continuous mild electric current, which is particularly effective in the treatment of rheumatism and like diseases.

To the above purposes, my invention consists in certain novel features of construction and arrangement of parts, which will be hereinafter more fully set forth, pointed out in the claims, and illustrated in the accompanying drawings, in which:—

Figure 1 is a perspective view of my improved appliance ready for use; Fig. 2 is a detail elevation of a modified form of one of the electrodes made use of in my improved appliance.

In the construction of the appliance as shown, I provide a collar made up of a pair of semi-circular sections 1, of reticulated material, such as woven wire, and the rear ends of said sections are united by a section 2, of rubber, or analogous non-conducting material.

Arranged on the front end of each section 1 is a section 3, of rubber, or analogous non-conducting material, and embedded in one of these sections is a hook 4, adapted to be engaged by a ring or loop 5, carried by the opposite section, when the collar is positioned around the neck.

The wire of which the section 1 is woven is preferably of copper, or analogous material of high electrical conductivity, and said sections form the two electrodes which contact with the body of the patient, and which are necessary to insure the proper electrical action.

Fixed to the sections 1, on opposite sides thereof, are loops 6, to which are detachably connected hooks 7, which are carried by and electrically connected to insulated wires 8, which latter lead to the poles of a dry battery 9, of suitable size.

When the collar is in position around the neck of the patient, this dry battery hangs down onto the body of the patient, either in front or on the back, and is maintained in proper position by means of a cord or ribbon 10, the center of which is secured to said battery, and the ends of which pass around the body of the patient, and being tied together.

When my improved appliance is in use, with the collar around the neck, and the hooks 7 attached to the loops 6, a mild current is established, which current passes from one pole of the battery through one of the wires 8, from thence through one of the electrodes 1, from thence to the body of the patient, and said current returns to the battery through the opposite section 1 and wire 8 attached thereto.

My improved appliance can be worn both day and night without inconvenience to the patient, and thus said patient is enabled to receive constant treatment for rheumatism, or a like ailment.

The appliance is very compact, is hid from view while in use, and can be very easily and quickly placed in position for use, or removed therefrom.

I claim:—

An electro medical appliance, comprising a pair of semi-circular electrodes of reticulated material, the body portions of which are uncovered and exposed, and adapted to encircle the neck of a wearer, a section of flexible insulating material connecting the rear ends of the electrodes, flexible insulating sections arranged on the front ends of the electrodes, a hook fixed to one of the last mentioned insulating sections, a loop fixed to the opposite insulating section whereby the front ends of the semi-circular electrodes are connected, a battery, metal hooks connected to the sides of the electrodes, and conductors leading from the poles of the battery and being detachably secured to the hooks on the sides of the semi-circular electrodes.

In testimony whereof I have signed my name to this specification, in presence of two subscribing witnesses.

SAMUEL H. LACKLAND.

Witnesses:
M. P. SMITH,
E. L. WALLACE.